(12) United States Patent
Ramanujam

(10) Patent No.: US 6,937,389 B1
(45) Date of Patent: Aug. 30, 2005

(54) OPTICAL COMMUNICATION SYSTEMS AND OPTICAL AMPLIFIERS EMPLOYING PERIODIC COMBINERS AND METHODS

(75) Inventor: Nandakumar Ramanujam, Ellicott City, MD (US)

(73) Assignee: Corvis Corporation, Columbia, MD (US)

( * ) Notice: Subject to any disclaimer, the term of this patent is extended or adjusted under 35 U.S.C. 154(b) by 290 days.

(21) Appl. No.: 10/319,251

(22) Filed: Dec. 13, 2002

Related U.S. Application Data

(60) Provisional application No. 60/339,113, filed on Dec. 13, 2001.

(51) Int. Cl.[7] .................................................. H01S 3/00
(52) U.S. Cl. ................... 359/341.33; 359/334
(58) Field of Search ........................... 359/334, 341.33

(56) References Cited

U.S. PATENT DOCUMENTS

| | | | | |
|---|---|---|---|---|
| 5,920,423 A | * | 7/1999 | Grubb et al. | 359/341.33 |
| 5,936,763 A | * | 8/1999 | Mitsuda et al. | 359/341.33 |
| 6,292,288 B1 | * | 9/2001 | Akasaka et al. | 359/334 |
| 6,417,959 B1 | * | 7/2002 | Bolshtyansky et al. | 359/334 |
| 6,433,921 B1 | * | 8/2002 | Wu et al. | 359/334 |
| 6,459,829 B1 | * | 10/2002 | Yamauchi et al. | 385/24 |
| 6,606,337 B1 | * | 8/2003 | King | 372/70 |
| 6,611,369 B2 | * | 8/2003 | Matsushita et al. | 359/334 |
| 6,614,586 B2 | * | 9/2003 | Hayee et al. | 359/334 |
| 6,618,195 B2 | * | 9/2003 | Shieh et al. | 359/341.33 |
| 6,624,926 B1 | * | 9/2003 | Hayashi et al. | 359/334 |
| 6,636,659 B2 | * | 10/2003 | Kagi et al. | 385/24 |
| 6,674,567 B2 | * | 1/2004 | Ohtani et al. | 359/334 |
| 6,687,047 B2 | * | 2/2004 | Clark et al. | 359/341.1 |
| 6,763,165 B1 | * | 7/2004 | Wesstrom et al. | 385/37 |
| 2001/0021062 A1 | * | 9/2001 | Probster | 359/341.33 |
| 2002/0149838 A1 | * | 10/2002 | Wang et al. | 359/334 |
| 2003/0039025 A1 | * | 2/2003 | Mugino et al. | 359/334 |
| 2004/0096155 A1 | * | 5/2004 | Singh et al. | 385/37 |

OTHER PUBLICATIONS

Chang et la. Characteristics of Optical Fiber WDM with High Isolation. TENCON 99. Proceedings of the IEEE Region 10 Conference. Sep. 15-17, 1999. pp. 43-44. vol. 1.*

\* cited by examiner

*Primary Examiner*—Bernarr E. Gregory
*Assistant Examiner*—Deandra M. Hughes

(57) ABSTRACT

An optical system including an optical amplifier having an optical coupler adapted for receiving and coupling pump radiation from a plurality of pump radiation sources. The gain profile of the amplifier being modified to employ optical couplers that are periodic in radiation wavelength with a period $\Delta\lambda$.

20 Claims, 17 Drawing Sheets

OPTICAL COMMUNICATION SYSTEMS AND OPTICAL AMPLIFIERS EMPLOYING PERIODIC COMBINERS AND METHODS

CROSS-REFERENCE TO RELATED APPLICATIONS

This application is a continuation in part of and claims the benefit of U.S. Provisional Patent Application Ser. No. 60/339,113 filed Dec. 13, 2001 and entitled "Spacing Of Pump Wavelengths In Raman Amplification To Efficiently And Cost-Effectively Incorporate Multiplexers With Periodic Transmission/Reflection Response", which is incorporated herein by reference.

STATEMENT REGARDING FEDERALLY SPONSORED RESEARCH OR DEVELOPMENT

Not Applicable

BACKGROUND OF THE INVENTION

This invention relates to optical communications and specifically to a coupler with a periodic transmission response for coupling multiple radiation sources, and an optical amplifier using the coupler with a periodic transmission response.

Wave division multiplexing (WDM) increases bandwidth in optical communications by providing for communication over several wavelengths or channels. For long haul optical communications the optical signal must be periodically amplified. Current amplification schemes include Erbium doped fiber amplifiers (EDFA) and Raman amplifiers.

To maximize WDM capacity, it is desirable that the optical bandwidth of the system be as wide as possible. Thus, a wide range of optical signal wavelengths must be amplified. At the same time, it is desirable that the different optical signal wavelengths be amplified by about the same amount. Thus, it is desirable that the amplification gain profile of the amplification system should be both broad and relatively flat.

Raman amplification can provide a broad and relatively flat gain profile over the wavelength range used in WDM optical communications by using a plurality of different pump laser wavelengths. (See Y. Emori, "100 nm bandwidth flat-gain Raman Amplifiers pumped and gain-equalized by 12-wavelength channel WDM Diode Unit," Electronic Lett., Vol. 35, no. 16, p. 1355 (1999). and F. Koch et. al., "Broadband gain flattened Raman Amplifiers to extend to the third telecommunication window," OFC'2000, Paper FF3, (2000)). Raman amplifiers may be either distributed or discrete (See High Sensitivity 1.3 μm Optically Pre-Amplified Receiver Using Raman Amplification," Electronic Letters, vol. 32, no. 23, p. 2164 (1996)). The Raman gain material in distributed Raman amplifiers is the transmission optical fiber, while a special spooled gain fiber is typically used in discrete Raman amplifiers.

FIG. 1 is a schematic of a portion of a typical optical communications system with a multiplexer 10 and an optical amplifier 12, such as a Raman amplifier. The multiplexer 10 receives a number of optical signals Sa, Sb, . . . Sz, respectively transmitted at optical communications wavelengths λa, λb, . . . λz. The multiplexer 10 multiplexes the optical signals and transmits the multiplexed signal along transmission optical fiber 14 to the optical amplifier 12. The optical amplifier 12 amplifies and transmits the optical signals.

FIG. 2 is a more detailed schematic of a typical distributed Raman optical amplifier 50 which can be employed as amplifier 12 in the multiplexer-amplifier system of FIG. 1. The amplifier 50 includes optical pump assembly 51 (shown enclosed by dashed lines) and transmission fiber 64. In this amplification scheme, the pump assembly 51 includes pump radiation sources 56 that collectively provide, for example, twelve different pump wavelengths λ1 through λ12. The pump radiation sources 56 are typically lasers that each emit radiation at a different wavelength of the wavelengths λ1 through λ12, respectively. Those skilled in the art will appreciate that more or fewer than 12 different pump wavelengths may be used in a given implementation. The wavelengths for pump radiation sources 56 (as well their pump powers) are selected based upon a number of different system design considerations, e.g., to provide an output signal-to-noise ratio (SNR) with minimal excursion. The radiation from the pump radiation sources 56 is then coupled or combined at a pump radiation combiner or coupler 54, e.g., a multiplexer, and the coupled radiation is output at pump radiation coupler output 58.

The coupled radiation has a coupled radiation profile that is a combination of the individual radiation profiles of the radiation input into the pump radiation combiner or coupler 54. The pump radiation profile that will be coupled with the optical signal to be amplified is therefore the coupled radiation profile in this case. The pump radiation profile is output from output 58 and then coupled at pump-signal combiner 60 with the optical signal 62. Optical signal 62, i.e., the data signal, propagates in the transmission optical fiber 64 in a direction opposite to the radiation, i.e., a counterpropagation direction, of the pump radiation profile. Alternatively, co-propagating or bi-directional pumping may also be employed. The optical signal is amplified along transmission optical fiber 62.

In general the criteria upon which the pump radiation wavelengths are selected will result in the identification of a specific set of pump wavelengths which are non-uniformly spaced apart across a particular bandwidth. Thus a spacing $\Delta\lambda_1$ between a first pump wavelength and a second pump wavelength will be different than a spacing $\Delta\lambda_2$ between the second pump wavelength and a third pump wavelength. The combiner 54, on the other hand, is typically designed to combine wavelengths that have a uniform, minimum spacing relative to one another.

Accordingly, it would be desirable to provide structures and techniques for selecting pump wavelengths in Raman amplified optical communication systems which permit the usage of off-the-shelf combiners or couplers in Raman amplification pump units.

SUMMARY OF THE INVENTION

These, and other drawbacks and limitations of conventional optical communication systems and methods are overcome according to exemplary embodiments of the present invention wherein pump wavelengths are adjusted to match the periodic transmission grids of commercial combiners or couplers.

According to one embodiment of the invention there is provided an optical system for coupling radiation from a plurality of radiation sources. The optical system comprises: an optical coupler adapted for receiving and coupling pump radiation from a plurality of pump radiation sources, wherein a transmission of the optical coupler is periodic in radiation wavelength with a period $\Delta\lambda$; and a pump-signal combiner optically coupled to the optical coupler and receiving pump radiation from the optical coupler, the pump-signal combiner adapted for coupling pump radiation from the optical coupler with optical signals. The optical system may further comprise a multiplexer adapted for multiplexing the optical signals and transmitting the optical signals to the pump-signal combiner, wherein the multiplexer multiplexes and transmits optical signals with a transmission that is periodic in optical wavelength with the period $\Delta\lambda$. The optical system may also comprise a plurality of pump radiation sources optical coupled to and providing pump radiation to the optical coupler.

According to another embodiment of the invention there is provided a method of coupling pump radiation from a plurality of pump radiation sources. The method comprising the steps of: inputting the pump radiation from the plurality of pump radiation sources to an optical coupler, the pump radiation having more than one pump radiation wavelength, the optical coupler having a transmission that is periodic in radiation wavelength with a period $\Delta\lambda$; coupling the pump radiation in the optical coupler to provide coupled pump radiation; and coupling the coupled pump radiation with optical signals. The method may further comprise multiplexing the optical signals, wherein the multiplexing has a transmission function that is periodic in wavelength with the period $\Delta\lambda$.

According to another embodiment of the invention there is provided an optical system for coupling a plurality of groups of pump radiation sources. The system comprises: a plurality of N optical couplers, the couplers numbered i=1 to i=N, each ith optical coupler adapted for receiving and coupling pump radiation from a respective group of the plurality of groups of pump radiation sources, wherein a transmission of each ith optical coupler is periodic in radiation wavelength with a respective period $\Delta\lambda i$; a plurality of pump-signal combiners, each pump-signal combiner optically coupled to a respective one of the optical couplers and receiving pump radiation from the respective one of the optical couplers, each pump-signal combiner adapted for coupling pump radiation from the respective one of the optical couplers with respective optical signals; and a plurality of N first stage multiplexers, the first stage multiplexers numbered i=1 to i=N, each ith first stage multiplexer adapted for multiplexing the respective optical signals and transmitting the respective optical signals to a respective one of the pump-signal combiners, wherein each ith first stage multiplexer multiplexes and transmits optical signals with a transmission that is periodic in optical wavelength with the respective period $\Delta\lambda i$. The optical system may further comprise a second stage multiplexer adapted for receiving and multiplexing optical signals from the plurality of pump-signal combiners. The optical system may further comprise a plurality of groups of pump radiation sources, each group of pump radiation sources optical coupled and providing pump radiation to a respective optical coupler.

According to another embodiment a method of coupling pump radiation from a plurality of groups of pump radiation sources is provided. The method comprises the steps of: inputting the pump radiation from each group of the plurality of groups of pump radiation sources to respective optical couplers of a plurality of optical couplers, the couplers numbered i=1 to i=N, each ith optical coupler having a transmission that is periodic in radiation wavelength with a respective period $\Delta\lambda i$; coupling pump radiation in each ith optical coupler to provide respective coupled pump radiation; and coupling the respective coupled pump radiation with respective optical signals. The method may further comprise performing a first multiplexing of the respective optical signals to provide first muliplexed optical signals, wherein the multiplexing has a transmission function that is periodic in wavelength with the period $\Delta\lambda i$ of the ith respective optical coupler. The method may further comprise: performing a second multiplexing of the first multiplexed optical signals.

DETAILED DESCRIPTION OF THE PREFERRED EMBODIMENTS

Figure 1:
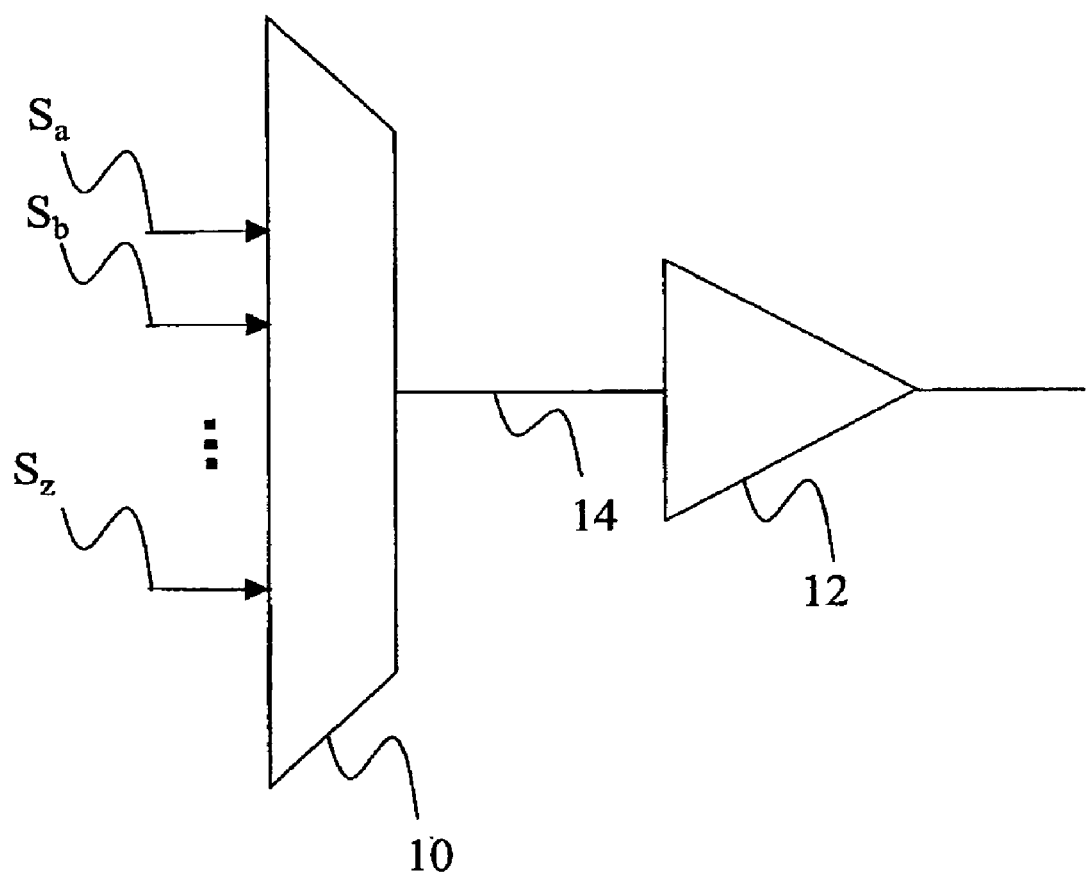
FIG. 1 is a schematic of a portion of a typical optical communications system with a multiplexer and an optical amplifier.
Figure 2:
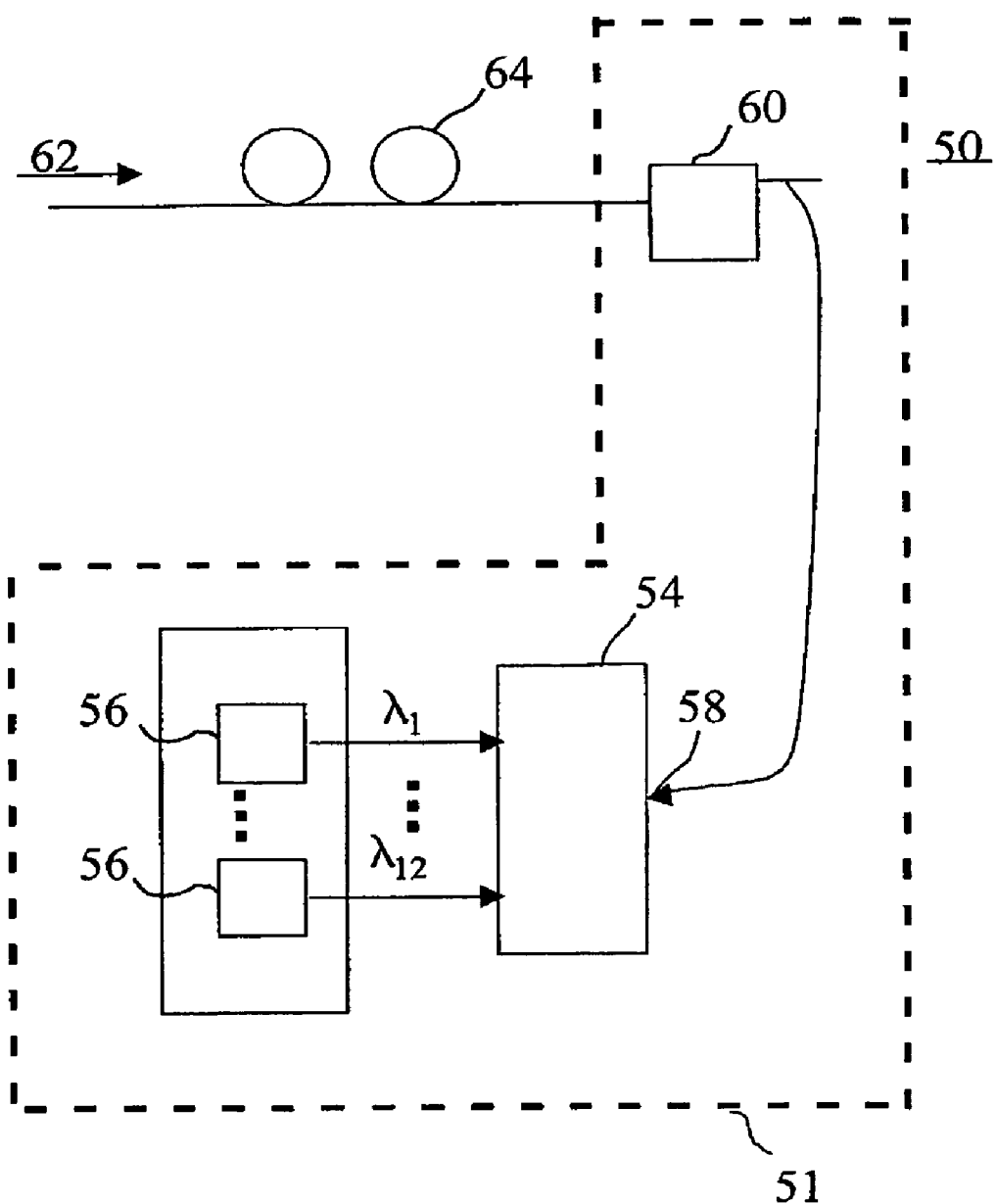
FIG. 2 is a schematic of a typical Raman amplifier employed in the optical communication system of FIG. 1.
Figure 3:
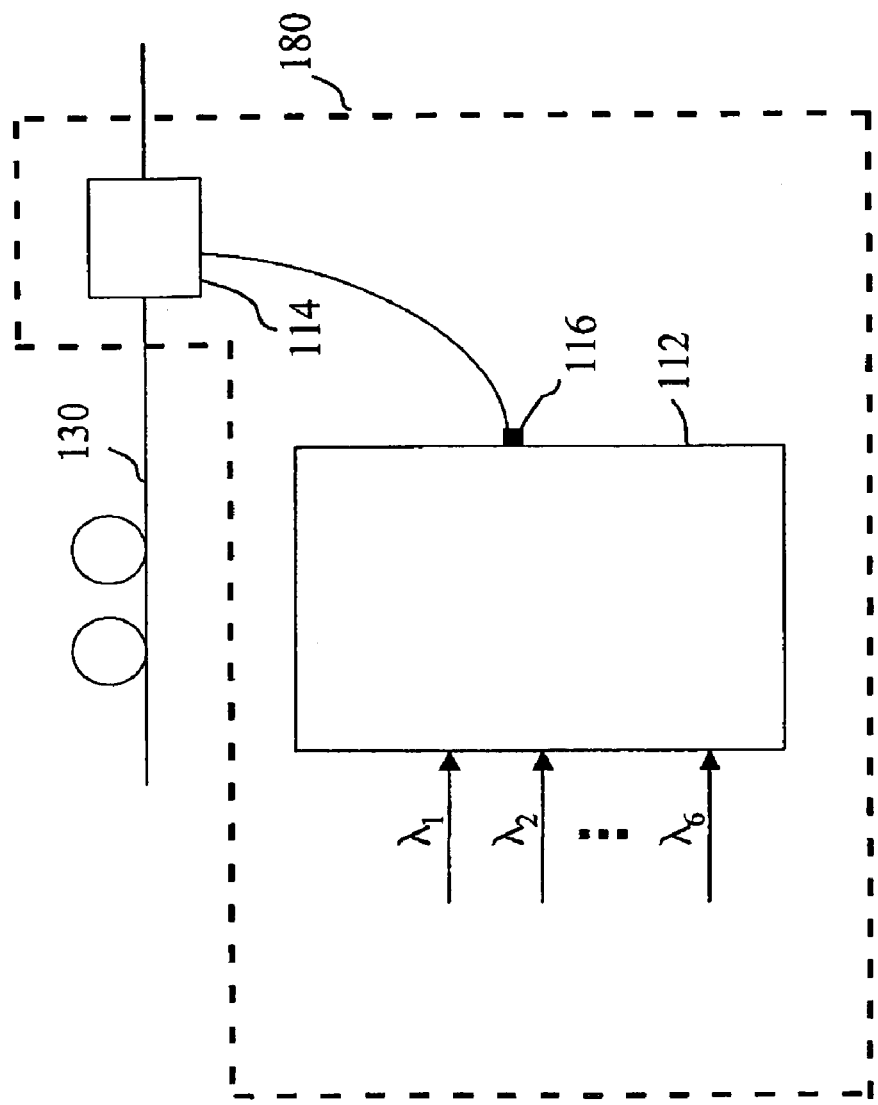
FIG. 3 is a schematic of an optical system which is a pump assembly according to an embodiment of the invention.

According to an aspect of the invention, the pump wavelengths of an optical communications system are adjusted so that the wavelengths fall on a grid which is periodic in wavelength, where the periodic grid corresponds to the transmission function of the pump wavelength combiner or coupler of the system. For ease of illustration, the pump wavelengths are adjusted for the optical communications system shown in FIG. 3, illustrating a portion of a Raman amplification system with six pump wavelengths, $\lambda 1$ through $\lambda 6$. Of course, the present invention is not limited to a Raman amplification with six pump wavelengths, but is applicable in general to an optical system employing a variety of pump wavelengths that are coupled via a coupler with a transmission function that is periodic in wavelength.

FIG. 3 is a schematic of an optical system which is a pump assembly 180 which can be used for Raman amplification. Pump radiation having six pump wavelengths, $\lambda 1$ through $\lambda 6$ is input into coupler 112. The coupler 112 couples the pump radiation and outputs the coupled radiation via the output 116. The pump radiation output from the coupler output 116 is transmitted to the pump-signal combiner 114, where it is combined with an optical signal transmitted along transmission fiber 130. The pump radiation serves to amplify the optical signal transmitted along the transmission fiber 130 through Raman amplification.

Figure 4:
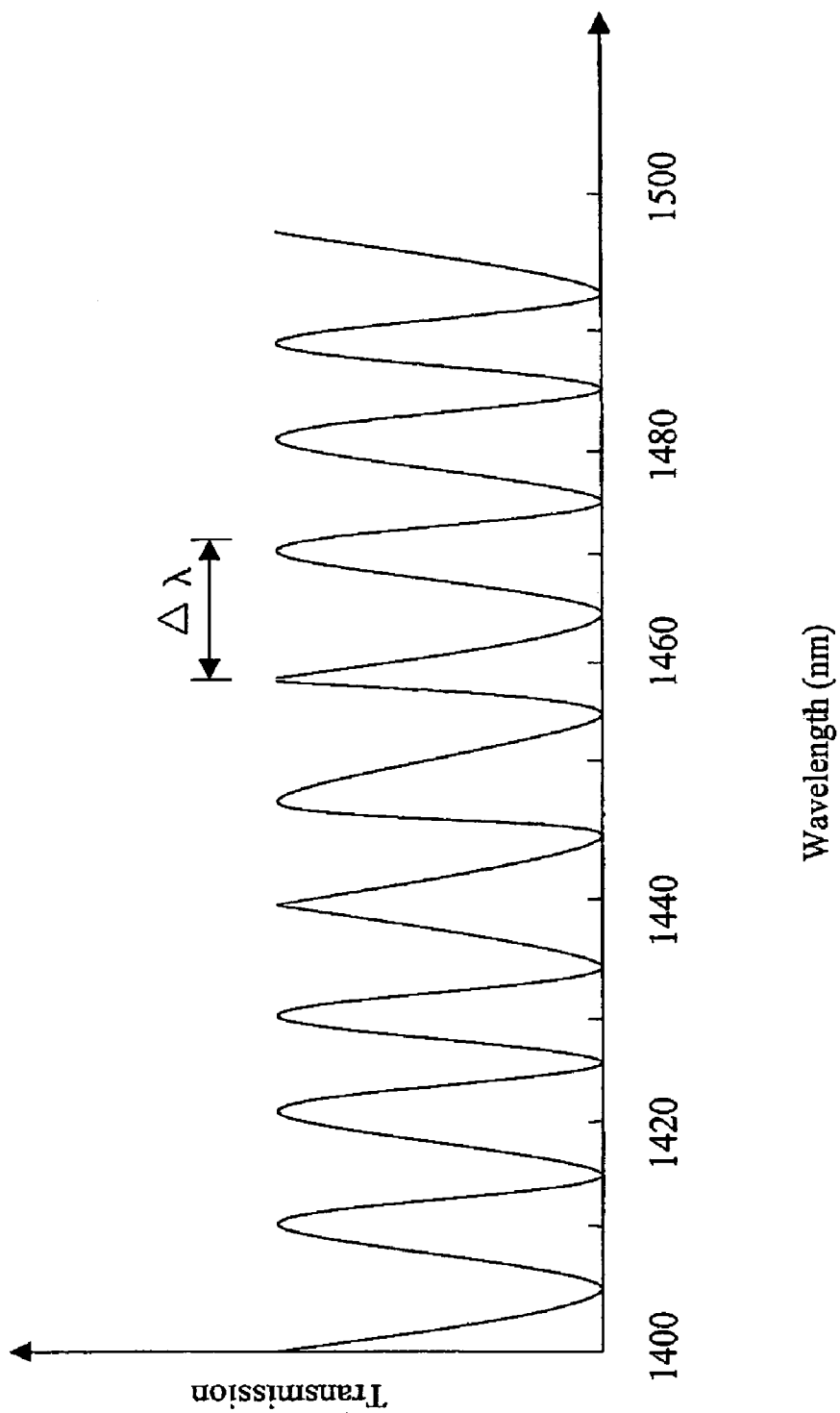
FIG. 4 illustrates an exemplary transmission function of a coupler, where the transmission function is periodic in wavelength.

The coupler 112 has a transmission function that is periodic in wavelength. FIG. 4 illustrates an exemplary transmission function of the coupler 112 as a function of radiation wavelength $\lambda$ over a wavelength range. As can be seen, the period of the transmission function is $\Delta\lambda$, thus the spacing between the transmission maxima is $\Delta\lambda$. FIG. 4 shows the spacing $\Delta\lambda$ to be 10 nm. However, in general the spacing $\Delta\lambda$ may have other values with the particular spacing dependent upon the specific application. The transmission of radiation through the coupler 112 will be a maxima for radiation with wavelengths that correspond to the transmission maxima. FIG. 4 illustrates the transmission function to vary in a roughly sinusoidal fashion. However the present invention is not so limited, and will depend upon the particular type of coupler employed in the optical system. The transmission function may be a step function or sawtooth in shape, for example. Thus, the transmission function may be, but need not be smoothly varying. The transmission function should vary periodically in wavelength, however.

Figure 5:
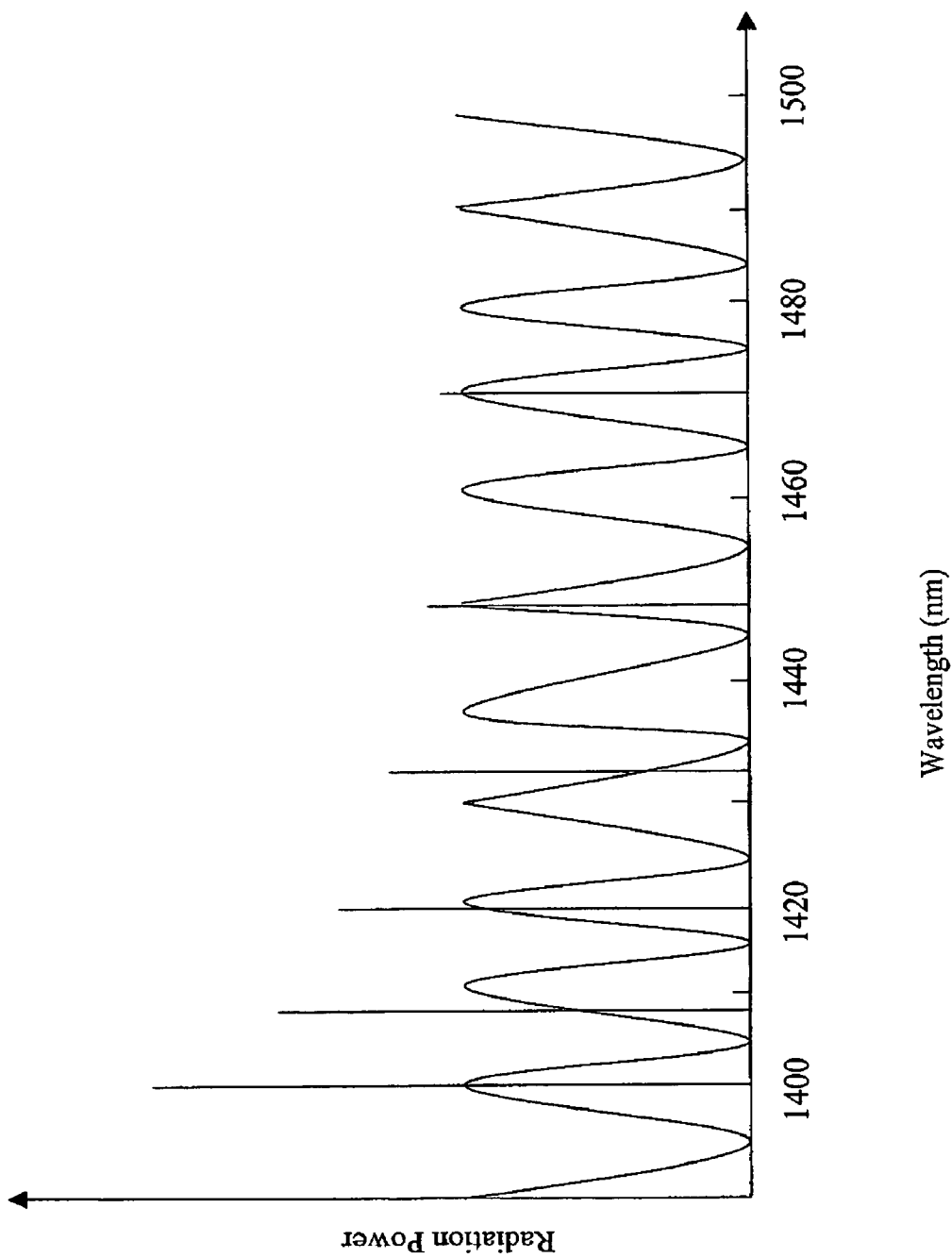
FIG. 5 illustrates an unadjusted set of pump wavelengths and pump powers according to a first example of an aspect of the present invention.
Figure 6:
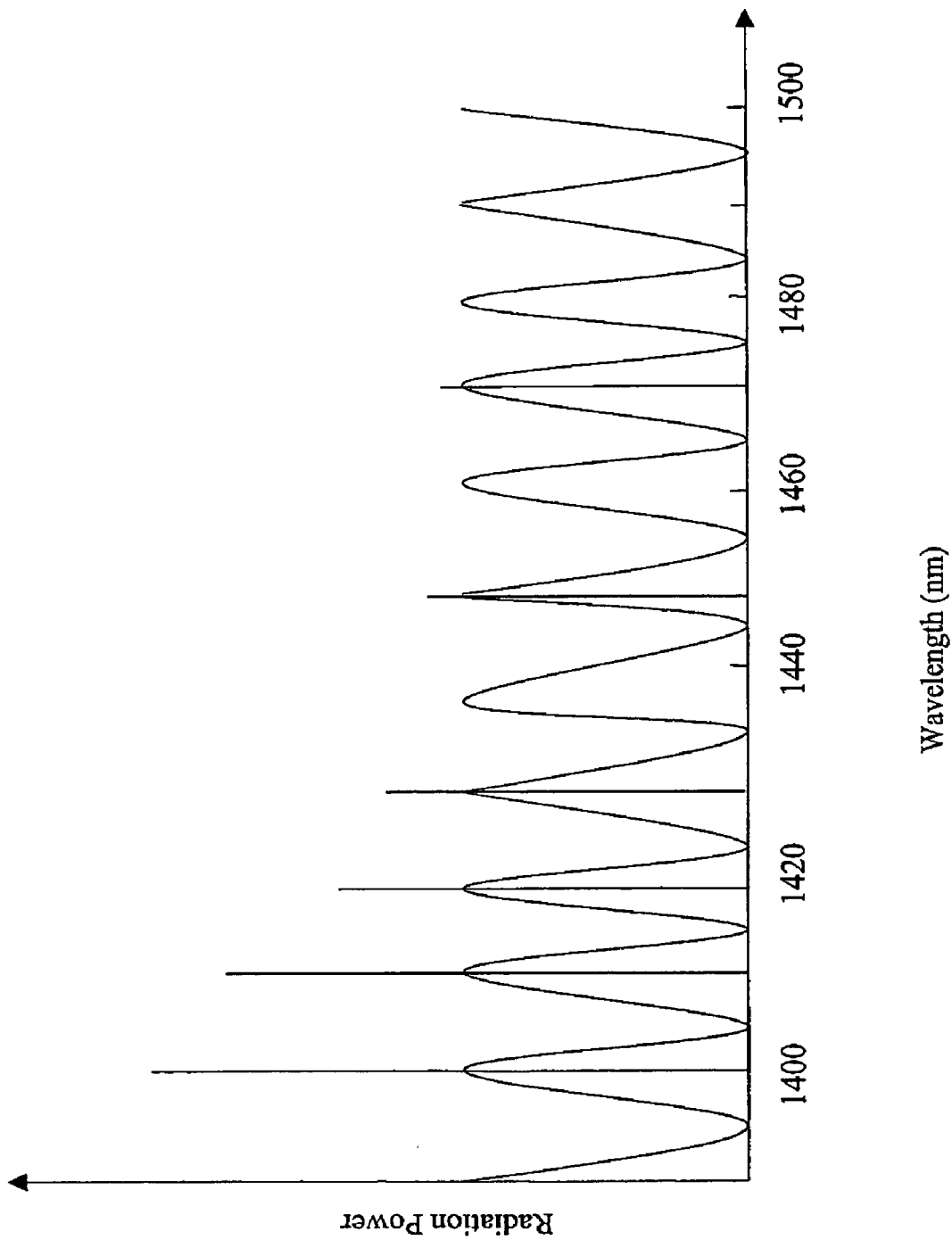
FIG. 6 illustrates an adjusted set of pump wavelengths according to the first example of an aspect of the present invention.

A first example of optimizing the pump wavelengths so that the wavelengths fall on transmission maxima of a periodic grid is now illustrated for the six wavelengths, $\lambda 1$ through $\lambda 6$, in FIGS. 5 and 6. The six wavelengths, $\lambda 1$ through $\lambda 6$, are illustrated from left to right, respectively, in the power versus wavelength graphs of FIGS. 5 and 6. In general, optimizing the wavelengths will depend upon the design parameters of the particular system to be optimized. For example, for the pump assembly for Raman amplification illustrated above in FIG. 3, design parameters may include the bandwidth of the optical signals to be amplified, the Raman gain required, the acceptable gain divergence from the desired gain profile, the pump power at each wavelength, and the spacing $\Delta\lambda$ of the coupler. The number of pump wavelengths may also be a design parameter that may be varied in the optimization scheme. However, for this example it is assumed that the number of wavelengths is fixed at six. The spacing $\Delta\lambda$ of the coupler may also be fixed, for example, if it is desired that a specific coupler which has a fixed spacing $\Delta\lambda$ be employed in the system.

In this first example, it is assumed that the spacing $\Delta\lambda$ of the coupler is fixed at 10 nm, the coupler has transmission maxima at 1400 nm, the number of wavelengths is fixed at six, the bandwidth of the signal to be amplified is 80 nm and ranges from 1500 to 1580 nm, and the desired gain profile is a flat profile across the bandwidth. As a first step, the radiation powers and wavelengths are initially set to provide a flat gain profile over the signal bandwidth. FIG. 5 illustrates the initial set of radiation wavelengths and powers. FIG. 5 also illustrates the transmission function of the coupler 112 superimposed over the radiation powers for the purposes of illustration. As can be seen, four of the six wavelengths substantially correspond to transmission maxima of the transmission function of the coupler 112.

Wavelengths $\lambda 2$ and $\lambda 4$, i.e., the second and fourth wavelengths from the left, however, are slightly shifted with respect to their corresponding nearest transmission maxima. Thus, in this example, optimization is relatively simple and wavelengths $\lambda 2$ and $\lambda 4$ can be shifted slightly to correspond to their respective nearest transmission maxima while still maintaining a relatively flat gain profile.

FIG. 6 illustrates the six wavelengths $\lambda 1$ through $\lambda 6$ where wavelengths $\lambda 2$ and $\lambda 4$ have been shifted to correspond to transmission maxima. The pump powers for the six wavelengths do not change from FIG. 5 to FIG. 6. As a next step, the gain profile of the new set of wavelengths is determined over the bandwidth range. If the new gain profile is considered to be acceptable, the process of adjusting the pump wavelengths is considered to be finished. The gain profile acceptance criteria may be, for example, a minimum flatness value over the bandwidth range. The flatness may be measured, for example, as the gain divergence, i.e., deviation from the average gain, over the bandwidth range.

Figure 7:
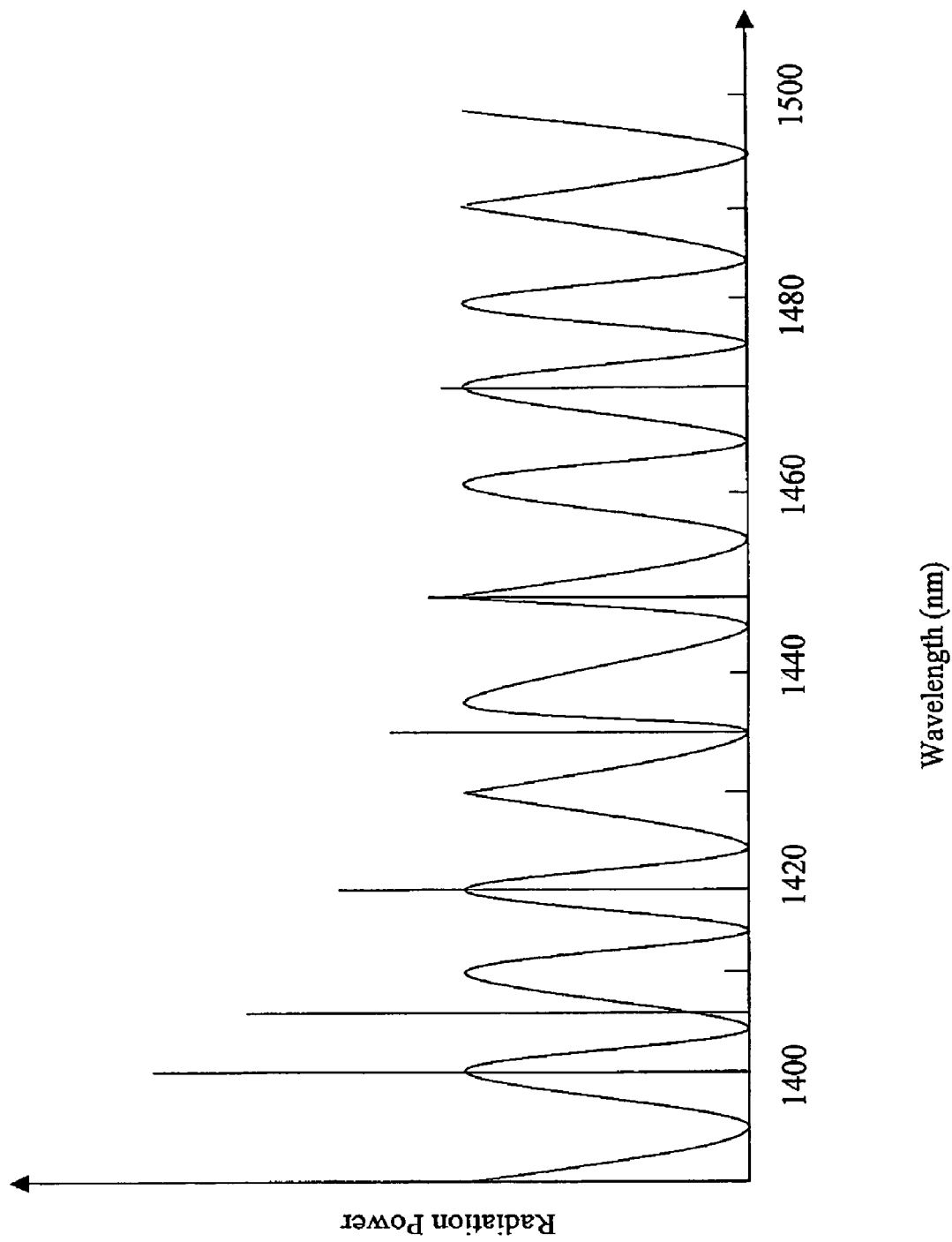
FIG. 7 illustrates an unadjusted set of pump wavelengths and pump powers according to a second example of an aspect of the present invention.
Figure 8:
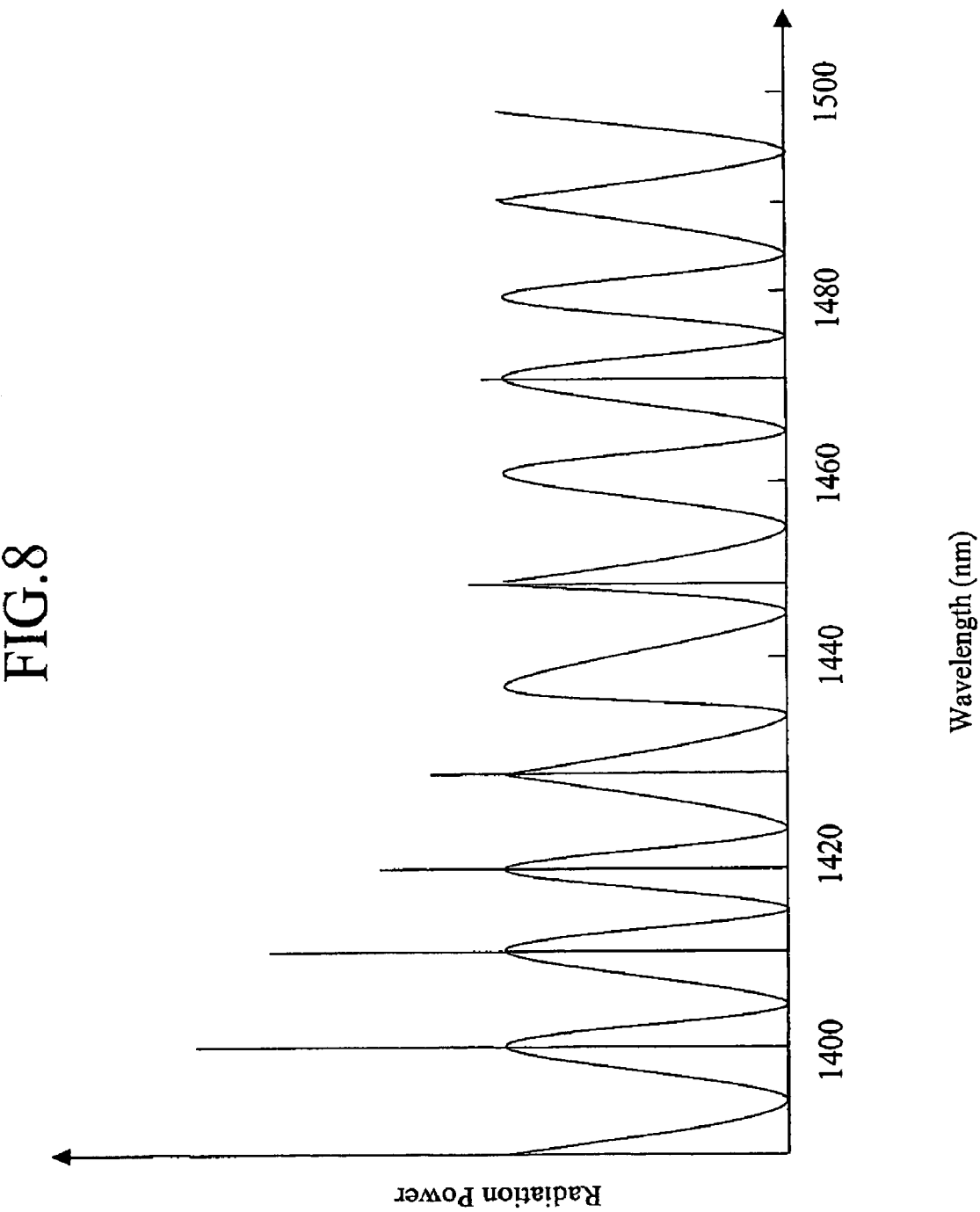
FIG. 8 illustrates an adjusted set of pump wavelengths according to the second example of an aspect of the present invention.
Figure 9:
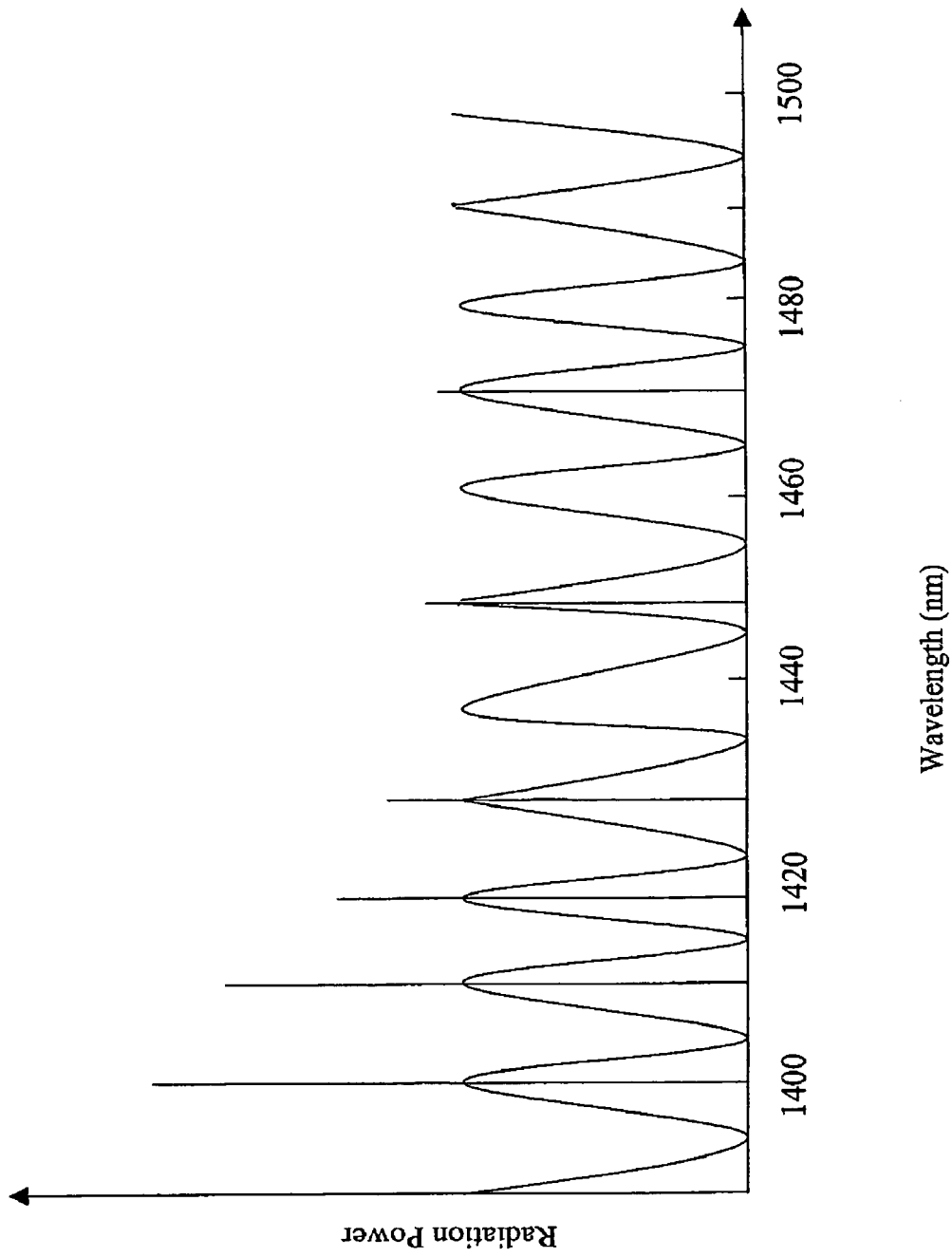
FIG. 9 illustrates the adjusted set of pump wavelengths with adjusted pump powers according to the second example of an aspect of the present invention.

FIGS. 7 through 9 illustrate a second example of optimizing and adjusting the pump wavelengths. As in the first example, in this second example the six wavelengths, $\lambda 1$ through $\lambda 6$, are illustrated from left to right, respectively, in the power versus wavelength graphs of FIGS. 7 through 9. Unlike the example of FIGS. 5 and 6, however, this second example requires adjusting the system parameters after the wavelengths are first adjusted. In other words, in this example, the first wavelength adjustment does not provide a gain profile that is deemed acceptable according to the gain profile criteria. For ease of illustration, it is assumed that the parameters of this second example are the same as the first example except for the initial radiation powers and wavelengths selected.

Again, as a first step, the radiation powers and wavelengths are initially set to provide a flat gain profile over the signal bandwidth. FIG. 7 illustrates the initial set of radiation wavelengths and powers. FIG. 7 also illustrates the transmission function of the coupler 112 superimposed over the radiation powers for ease of illustration. As in the first example, in this second example four of the six wavelengths substantially correspond to transmission maxima of the transmission function of the coupler 112. Wavelengths $\lambda 2$ and $\lambda 4$, however, are significantly shifted with respect to their corresponding nearest transmission maxima. Thus, in this second example, unlike the first example, two of the wavelengths must be significantly adjusted to correspond to transmission maxima.

FIG. 8 illustrates the six wavelengths $\lambda 1$ through $\lambda 6$ where wavelengths $\lambda 2$ and $\lambda 4$ have been shifted to correspond to their nearest transmission maxima. The pump power for the six wavelengths remains the same for FIGS. 7 and 8. As a next step, the gain profile of the new set of wavelengths is determined over the bandwidth range. In this second example the gain profile of the adjusted set of wavelengths is found not to satisfy the gain profile criteria. For example, if an acceptable gain profile is determined according to a minimum flatness, the adjusted set of wavelengths is found to provide a gain profile that is not sufficiently flat.

In this second example, the system design criteria must be further adjusted after the first adjustment of the pump wavelengths. For example, the radiation power at the pump radiation wavelengths may be adjusted. Alternatively, the requirement that the number of radiation wavelengths remain fixed at six, or that the spacing $\Delta\lambda$ remain fixed may be relaxed, and those parameters may be adjusted. After adjustment of the system parameters, the pump wavelengths are adjusted to the nearest maxima, if necessary, i.e., if the spacing Δλ is adjusted, and it is then determined if the newly adjusted pump wavelengths and powers will provide an acceptable gain profile.

In this second example, it is assumed that an adjustment of the pump radiation powers is sufficient to provide an acceptable gain profile. FIG. 9 illustrates the pump radiation wavelengths with adjusted pump powers that provide an acceptable gain profile. In FIG. 9 the pump power of the first wavelength λ1 is increased, while the pump powers of the third and fourth wavelengths λ3 and λ4 are decreased relative to their respective powers in FIG. 8. The system parameters are iteratively adjusted until an acceptable gain profile is achieved.

In the first and second examples of adjusting the pump wavelengths the pump powers are not adjusted as part of the wavelength adjusting steps. Alternatively, the pump powers may be adjusted as part of the wavelength adjusting step; and other system parameters may adjusted if the wavelength adjusting step is not sufficient to bring the system within acceptable criteria.

Figure 10:
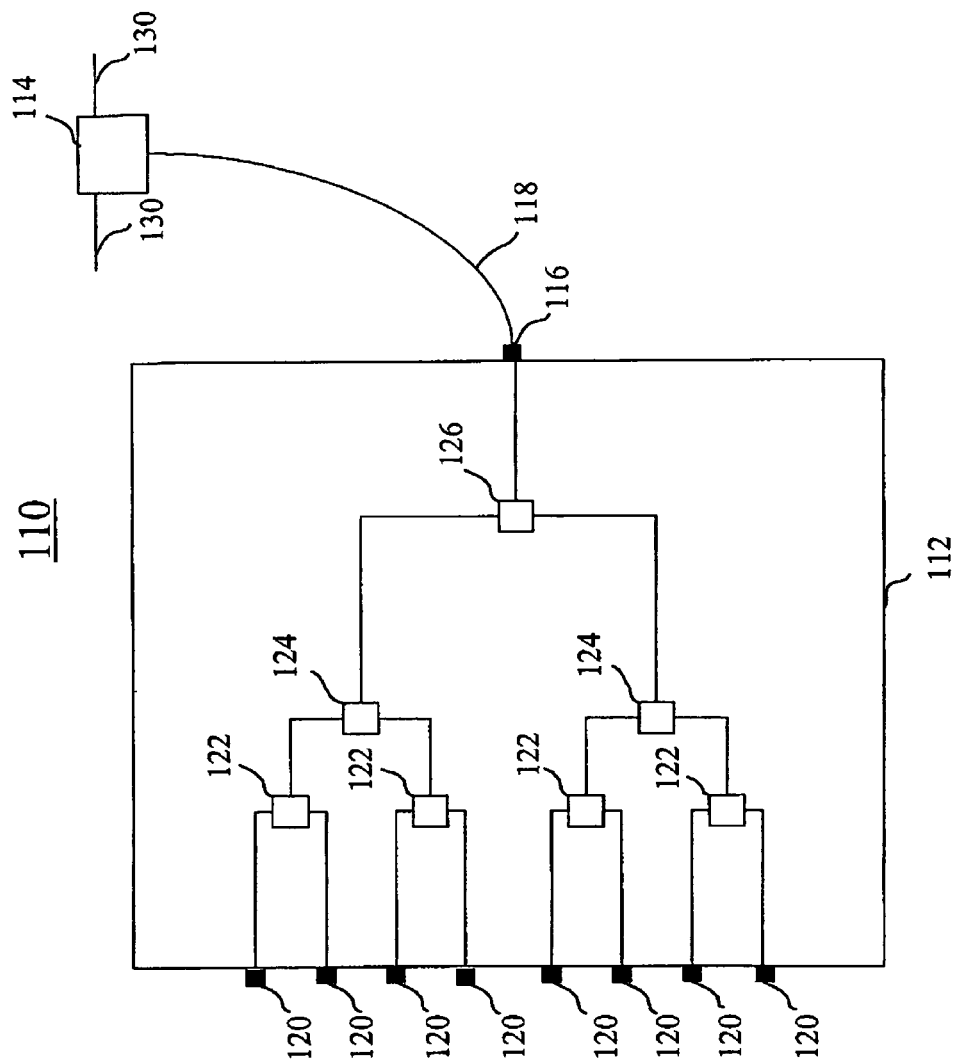
FIG. 10 is a schematic of an optical system with a coupler according to one embodiment of the present invention.

FIG. 10 is a schematic of an optical system 110 according to an embodiment of the invention. The optical system 110 includes an optical coupler 112 optically coupled to a pump-signal combiner 114. The coupler 112 is coupled to the pump-signal combiner 114 via an output 116 of the coupler 112 and optical fiber 118 between the output 116 and the pump-signal combiner 114.

The coupler 112 has a number of inputs 120, and is thus adapted for receiving radiation from a plurality of pump radiation sources (not shown in FIG. 10). The coupler 112 couples the radiation from the plurality of pump radiation sources and outputs the coupled radiation via the output 116.

In this embodiment the coupler 112 uses a cascade of radiation combiners as first stage combiners 122, second stage combiners 124, and a third stage combiner 126. The number of stages of combiners in the coupler 112 will depend on the number of radiation sources to be combined, and in general the greater the number of radiation sources the greater the number of stages. In FIG. 10, the coupler has eight inputs 120 and thus can combine eight radiation sources using three stages of combiners. Of course, the coupler 112 could have more or less than eight inputs depending on the application.

Each of the first stage combiners 122 couples the radiation from two different inputs 120 of the coupler 112, and outputs that coupled radiation to one of the combiners of the second stage combiners 124. Each of the second stage combiners 124 receives radiation from two of the first stage combiners 122, couples the radiation, and outputs that coupled radiation to the third stage combiner 126. The third stage combiner receives radiation from the two second stage combiners 124 and outputs that radiation at the coupler output 116. Thus, the combiners of the coupler 112 are arranged in a cascading fashion with the number of combiners decreasing in each successive stage.

The combiners 122, 124 and 126 may be fused biconic tapered couplers, fiber Bragg gratings, or thin film periodic transmission filters, for example. The combiners 122, 124 and 126 have a transmission function that varies periodically in wavelength with a period Δλ. Thus, the transmission function of the coupler 112 as a whole will also vary periodically in wavelength with a period Δλ.

Although the combiners 122, 124 and 126 all have a transmission function that varies periodically in wavelength with a period Δλ, the combiners are not limited to components that only transmit radiation. The combiners may include components that reflect radiation. In any case, the transmission of a combiner at a given wavelength is the ratio of the radiation power output from the combiner and the radiation power input into the combiner at the wavelength.

Although the coupler 112 illustrated in FIG. 10 is implemented using combiners arranged in a cascading fashion, the present invention is not so limited. Any coupler that has a transmission function which is periodic in wavelength with a period Δλ, and which serves to couple the radiation from multiple radiation sources is appropriate. Of course, the coupler must be able to couple the radiation from the particular number of radiation sources in the particular application desired.

The pump radiation output from the coupler output 116 is transmitted to the pump-signal combiner 114, where it is combined with an optical signal transmitted along transmission fiber 130. The pump radiation serves to amplify the optical signal transmitted along the transmission fiber 130, for example through Raman amplification. Alternatively, in discrete Raman amplifier applications, the optical signal may be amplified using a special gain fiber optically connected to the transmission fiber 130.

Figure 11:
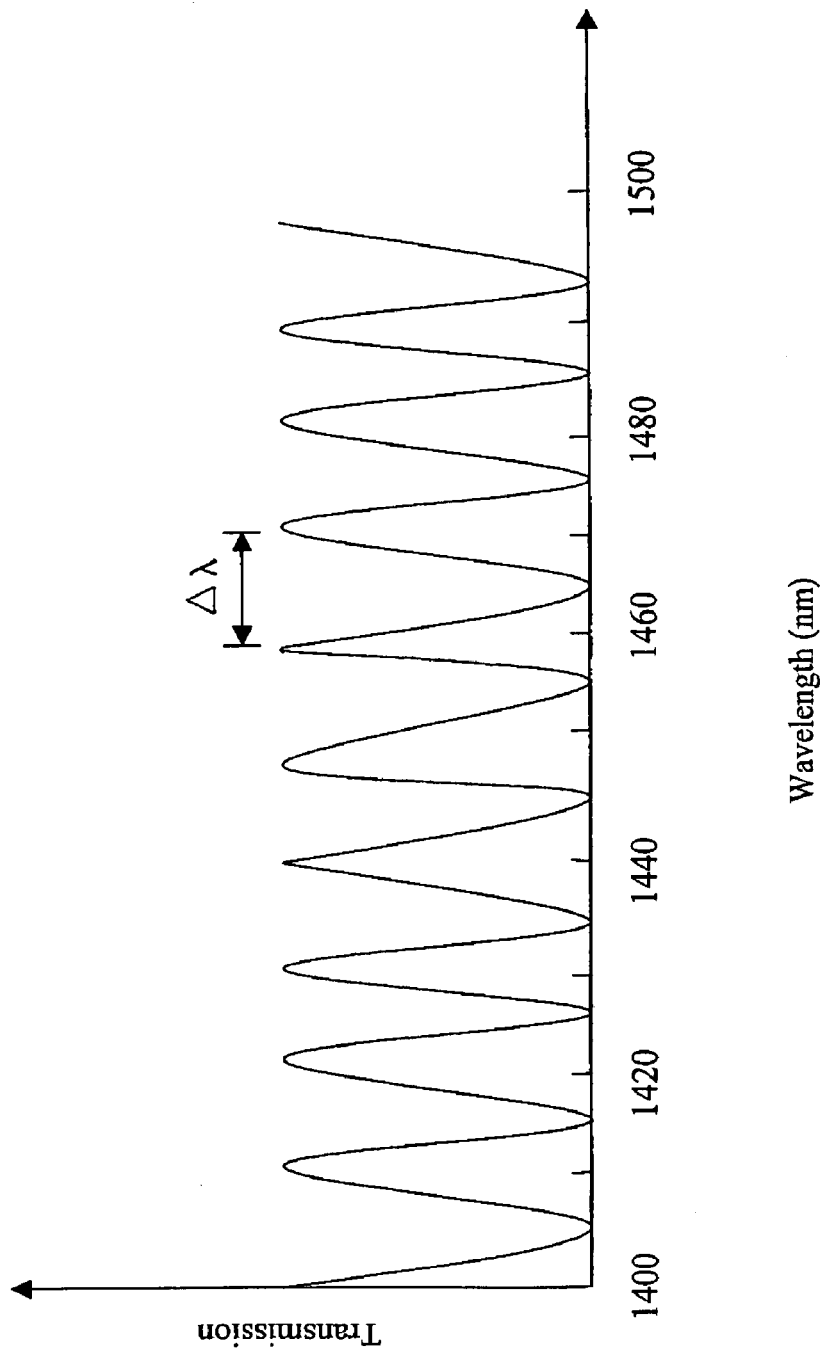
FIG. 11 illustrates a transmission function of the coupler of the optical system of FIG. 10.

FIG. 11 illustrates the transmission function of the coupler 112 as a function of radiation wavelength λ over a wavelength range. As can be seen the period of the transmission function is Δλ, thus the spacing between the transmission maxima is Δλ. If the coupler is to be used as part of pump assembly for a broad band Raman amplifier for amplifying signals in about a 100 nm band, the spacing may be 8–10 nm, for example. In FIG. 11 the spacing Δλ is 10 nm.

FIG. 11 illustrates the transmission function to vary in a roughly sinusoidal fashion. However the present invention is not so limited. The transmission function may be a step function or sawtooth in shape, for example. Thus, the transmission function may be, but need not be smoothly varying. The transmission function should vary periodically in wavelength, however.

Figure 12:
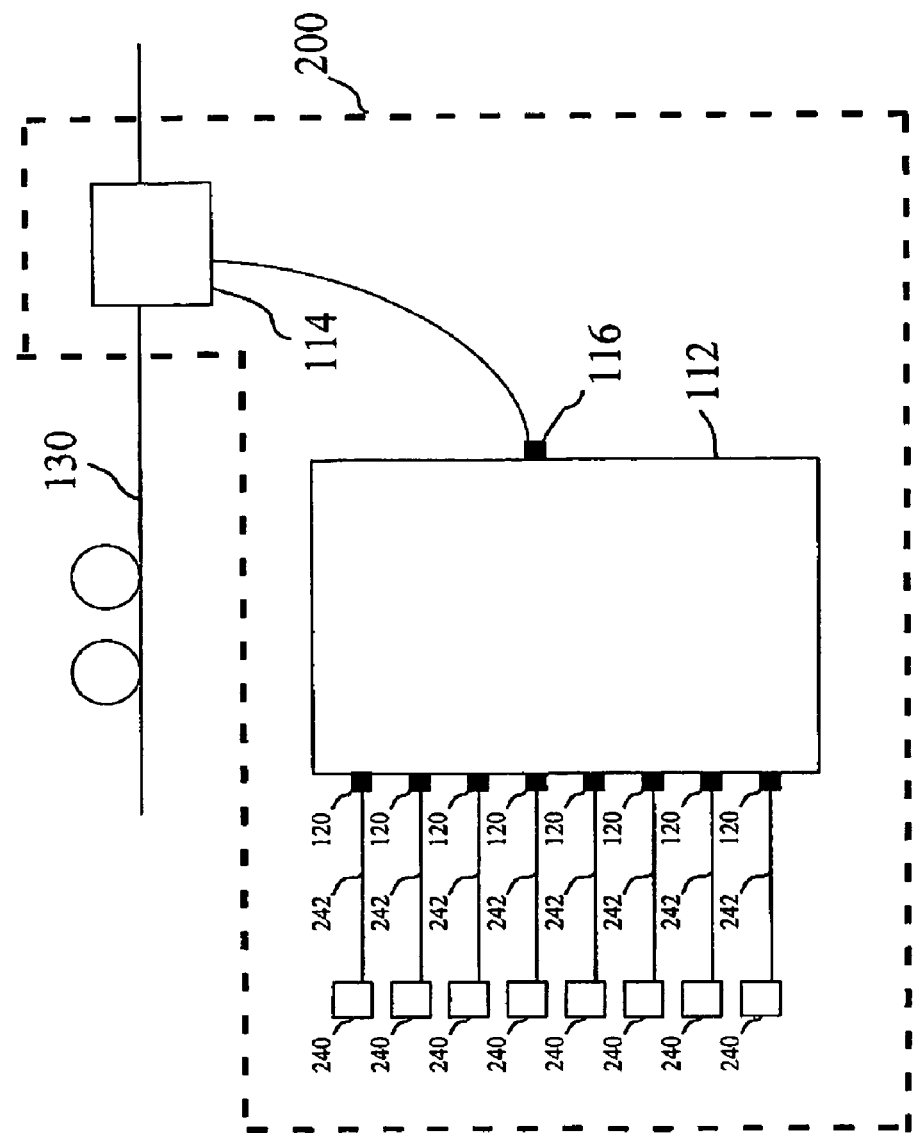
FIG. 12 is a schematic of a pump assembly employing the optical system with coupler of FIG. 11.

FIG. 12 illustrates an optical system which is a pump assembly 200 which can be used for Raman amplification, for example, according to an embodiment of the present invention. The pump assembly 200 includes a coupler 112 and pump-signal combiner 114. The coupler 112 and pump-signal combiner 114 are the same as that illustrated in FIG. 10, with like reference numerals denoting the same elements. Thus, description of the coupler 112 and pump-signal combiner 114 will be omitted in the description of the pump assembly of FIG. 12 for the sake of brevity.

The pump assembly 200 includes a plurality of pump radiation sources 240. Each of the pump radiation sources 240 is coupled to a respective one of the inputs 120 of the coupler 112, and may be coupled via optical fiber 242, for example. Typically, the radiation sources 240 provide radiation with respectively different wavelengths. However, it may be desired for some of the wavelengths to be the same for the purposes of redundancy, for example.

FIG. 12 shows eight radiation sources 240. However, the number of radiation sources may be more or less than eight depending upon the particular application. For example, the number of radiation sources may be twelve, twenty, or twenty-four. Furthermore, each radiation source 240 may emit radiation at more than one wavelength. As a further alternative, radiation from more than one radiation source may be coupled prior to being input at a single input of the coupler 112.

The pump radiation sources 240 may be lasers, such as semiconductor lasers, for example. The lasers may emit in the range of 1400 to 1650 nm, for example. Alternatively the pump radiation sources may be light emitting diodes.

The particular wavelengths of the pump radiation sources 240 are chosen according to the application. For example, if the pump assembly 200 is to be used as part of a broad band Raman amplification system, it may be desirable to provide a substantially flat Raman gain profile over the range of signal wavelengths to be amplified. At the same time, the periodic transmission of the coupler 112 should be considered when selecting the pump radiation source wavelengths.

In general the wavelengths that will provide for the flattest Raman gain profile or other desired gain profile will not perfectly coincide with the transmission maxima of the coupler 112 as described with respect to the first and second examples of FIGS. 5 through 9. In other words, the optimum wavelengths will not fall on the maxima of the periodic transmission grid. However, if the period $\Delta\lambda$ is sufficiently small, the wavelengths that provide the flattest Raman gain profile need only be slightly adjusted, and the flatness of the Raman gain profile will typically remain acceptable. The slight reduction in Raman gain profile flatness is offset by the advantages of being able to couple the pump assembly using a commercial coupler that also has a transmission function which is periodic in wavelength with a period $\Delta\lambda$. Using a commercial coupler reduces the overall system cost.

Figure 13:
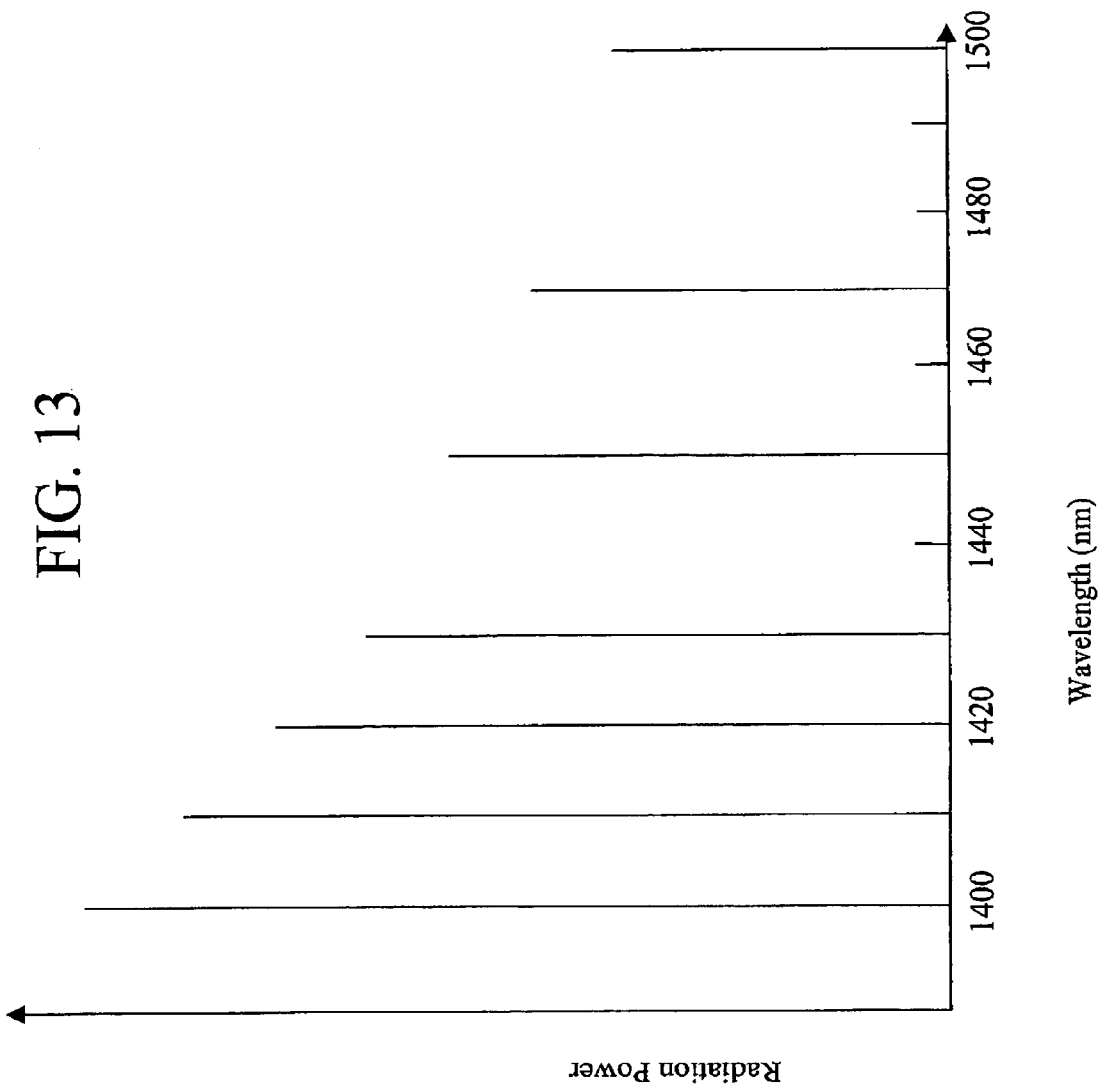
FIG. 13 illustrates exemplary pump wavelengths and pump powers for the pump assembly of FIG. 12.

FIG. 13 illustrates an example of wavelengths and radiation power adjusted to provide a desired gain profile for Raman amplification and, at the same time, to correspond to the transmission maxima of the coupler 112. In the example illustrated in FIG. 13, the pump wavelength range required to provide the desired gain profile is about 100 nm, and ranges from about 1400 nm to about 1500 nm. The desired gain profile in this example requires the pump powers to be higher for shorter wavelengths, and requires more wavelengths at shorter wavelengths.

The first transmission maxima in FIG. 13 occurs at 1400 nm and $\Delta\lambda$ is 10 nm in this example. Thus, maxima occur every 10 nm. The wavelength spacing for the adjusted pump wavelengths occurs every 10 nm up to the fourth wavelength at 1430 nm and then the spacing increase to 20 nm and finally to 30 nm. Thus, all the wavelengths are adjusted to coincide with a transmission maxima of the coupler, where the transmission maxima are shown in FIG. 11.

In the FIG. 13 example, wavelengths corresponding to eight pump radiation sources are employed. Because of the high power required at the shortest wavelength, two radiation sources are employed to provide the radiation at 1400 nm.

Figure 14:
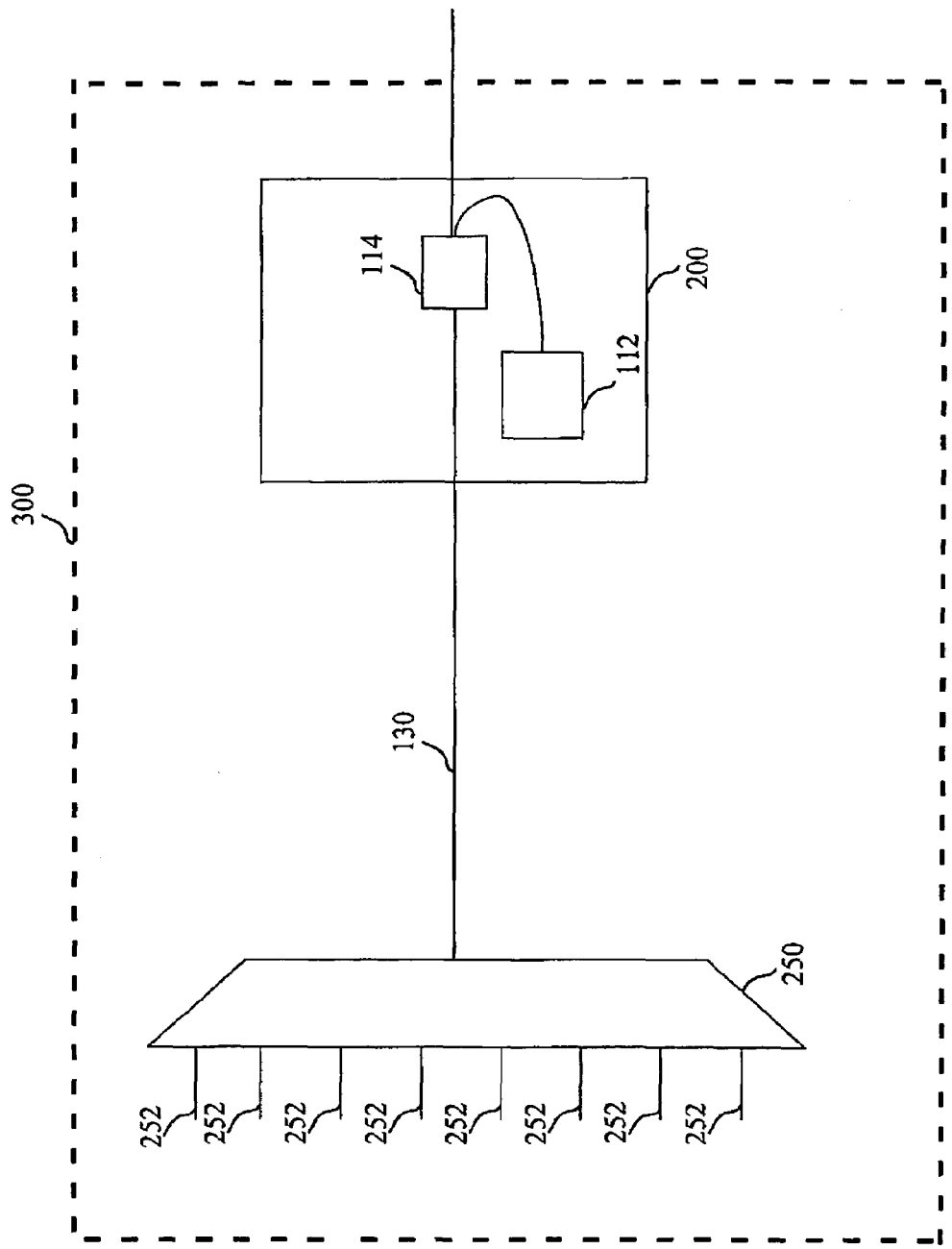
FIG. 14 is a schematic of a portion of an optical communications system with a single multiplexer employing the pump assembly of FIG. 12.

FIG. 14 illustrates a portion of an optical communications system 300 including a multiplexer 250 and the pump assembly 200 according to an embodiment of the present invention. The pump assembly 200 is the same as that illustrated in FIG. 12, with like reference numerals denoting the same elements. Thus, description of the pump assembly 200 will be omitted in the description of the optical communications system 300 of FIG. 14 for the sake of brevity.

The multiplexer 250 is coupled to the pump assembly 200 via optical transmission fiber 130. The multiplexer 250 will have a transmission function with the same transmission maxima as the coupler 112 in this embodiment. The pump assembly 200 provides radiation for amplifying a multiplexed optical signal from the multiplexer 250. The multiplexer 250 receives optical signals having different wavelengths via a plurality of signal input lines 252. The multiplexer 250 multiplexes the optical signals received and transmits these optical signals via transmission fiber 130. Pump radiation from the pump assembly 200 is coupled to the transmission fiber 130 via a pump-signal combiner 114 and amplifies the optical signals in the transmission fiber 130.

Figure 15:
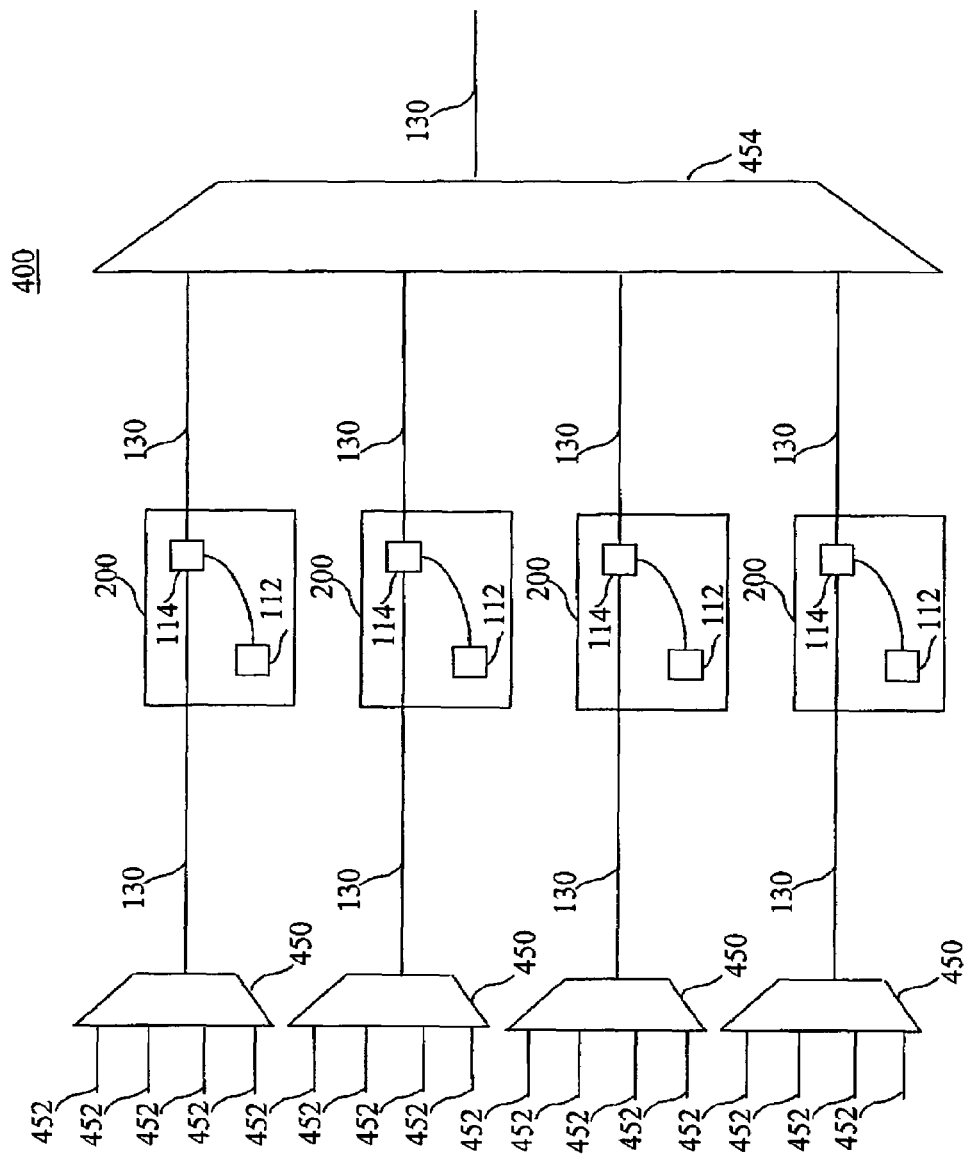
FIG. 15 is a schematic of a portion of an optical communications system with staged multiplexers employing the pump assembly of FIG. 12.

FIG. 15 illustrates a portion of a communications system 400 according to another embodiment of the invention. In this embodiment multiplexing is performed in two stages. The communications system 400 has N first stage multiplexers 450 and a second stage multiplexer 454. Thus, the first stage multiplexers 450 are identified as numbered from i=1 to N. Each multiplexer 450 of the first stage multiplexers is optically connected to a respective pump assembly 200 of a plurality of pump assemblies. The number of pump assemblies 200 is also N, and the pump assemblies 200 are thus also numbered from i=1 to N. Each of pump assemblies 200 is the same as that illustrated in FIG. 12, with like reference numerals denoting the same elements. Thus, description of the individual pump assemblies 200 will be omitted in the description of the optical communications system 400 of FIG. 15 for the sake of brevity.

FIG. 15 illustrates only four first stage multiplexers 450 and four corresponding pump assemblies 200 for ease of illustration, i.e., N=4. However, the number of first stage multiplexers 450 (and corresponding pump assemblies 200) may be more or less than four, and may be two or six, for example. The first stage multiplexers 450 will combine one or more signal channels being carried in waveguides 452.

In the embodiment of FIG. 15 each of the individual pump assemblies 200 has a corresponding coupler 112. Thus, the number of couplers is N, and the couplers are numbered from i=1 to N. In a similar fashion to the embodiment of FIG. 14, in the embodiment of FIG. 15 each of the couplers 112 has a transmission function that is periodic in radiation wavelength. However, in the embodiment of FIG. 15 the period of transmission function of the different couplers 112 need not be the same. Thus, in general the ith coupler will have a period $\Delta\lambda i$ which may be different from the period of the other couplers.

In the embodiment of FIG. 15, each of the pump assemblies may be used to amplify a different portion of the overall signal band to be amplified. Specifically, each of the pump assemblies need only amplify a subband range which is 1/N times the overall bandwidth range. For example, if the signal band to be amplified ranges from 1500 to 1600 nm, i.e., a bandwidth of 100 nm, and N is equal to four, then each of the pump assemblies need only amplify a subband range with a bandwidth of about 25 nm. Furthermore if the pump radiation wavelength range required to amplify the overall signal range is 1400 to 1500 nm, then the range of pump wavelengths for each of the pump assemblies need only be about 25 nm, i.e., one-fourth of 100 nm.

The second stage multiplexer 454 multiplexes the entire signal wavelength range. The second stage multiplexer 454 receives optical signals which have been amplified from the pump assemblies 200, and multiplexes these signals. The multiplexed signals are transmitted via another transmission fiber 130 downstream of the second stage multiplexer 454.

Each ith multiplexer of the first stage multiplexers 450 will have a transmission function that is periodic in optical wavelength with a period $\Delta\lambda i$. Multiplexers with a transmission function periodic in wavelength are generally commercially available. Thus, the cost of the first stage multiplexer portion of the system can be reduced.

The ith coupler and the corresponding ith first stage multiplexer should have an optical transmission function with the same period, and thus both the ith coupler and corresponding ith first stage multiplexer have the same period Δλi. On the other hand, the separate multiplexers of the first stage multiplexers 450 need not have the same period Δλi.

Because the pump assemblies provide pump radiation to amplify only about one fourth the overall signal band, the periods Δλi may be less than that required for amplification of the entire band if the same number of radiation sources are used in the pump assembly. For example if a sub band width of 25 nm is to be amplified using one of the pump assemblies, Δλi may be in the range of about 2 to about 2.5 nm.

When the total signal bandwidth is divided into sub bands, the pump wavelengths for each sub band can be individually tailored to provide a desired gain profile using a periodic transmission combiner. The pump wavelengths for multiple sub bands also can be determined and used to modify the periodic pump wavelengths for the individual sub-bands. For example, the above mentioned procedure can be used to select the periodic wavelengths for each sub-band. Then, either large sub-bands are identified or the entire signal bandwidth is used to select appropriate periodic pump wavelengths. The periodic pump wavelengths for the entire signal bandwidth is compared to the periodic pump wavelengths for the sub-bands and used to verify or modify the individual periodic pump wavelengths.

Alternatively, the pump wavelengths can be selected to provide desired gain profiles in the individual sub-bands, as well as large sub-bands and the entire signal bandwidth. The pump wavelengths determined for each of the sub-bands and the entire bandwidth can be used to identify how each of the pump wavelengths should be modified to provide periodic pump wavelengths that most closely match the desired gain profile in the various sub-bands and the entire signal bandwidth. For example, pump wavelengths can be identified to provide desired gain profiles in each of the S-, C-, and L-, band wavelength ranges, which nominally span 1500 nm–1620 nm. Pump wavelengths could be identified to provide desired gain profiles across the entire signal bandwidth, as well as across large sub-bands, i.e., S-C, C-L, or portions of each of the sub-bands.

In addition, it will be appreciated that multiple pump wavelength and pump power combination may be identified that can provide desired gain profiles and gain profile flexibility, which allows the gain profile to be varied during installation and/or operation of the amplifier. In fact, it may be desirable to employ multiple amplifiers, which have the same, similar, or different gain profiles. For example, in Raman amplifiers, the gain profile will tend to have peak gains in the signal corresponding the pump wavelengths, which is nominally around 13.1 THz from the pump wavelength for silica-based fibers. Thus, the selection of different pump wavelengths in two amplifiers could provide the same overall gain profile requirements, but the gain at the individual wavelengths with the wavelength range may be different. These amplifiers can be used in combination to minimize the overall gain profile variations using techniques such as those described in U.S. Pat. Nos. 6,115,174 and 6,356,383, which are incorporated herein by reference.

It will be appreciated further that period pump wavelengths selected for each band may overlap, thus requiring coordination of the pump wavelengths between the various bands. For example, the pump wavelengths for the C-band might range from 1420 nm–1480 nm and pump wavelength for the L-band may range from 1460 nm–1520 nm. Thus, the selection of combiners for each sub-band should take into consideration the pump wavelengths of the other sub-bands.

Also, the periodic nature of the multiplexing stages can be used to provide additional efficiencies in pump combining when adding pump wavelengths for amplifying another sub-band, providing temporary power, etc. For example, periodic devices, such as fused tapered coupler, will have a primary periodic transmission between two wavelengths, e.g., 30 nm between 1420 and 1450 nm, but can have secondary transmission wavelengths that is twice the period from the primary transmission wavelength, i.e., 60 nm in the present example. As such, in the 1420/1450 fused tapered coupler example, it could be used to combine a 1420 nm pump wavelength for the C-band with a 1510 nm pump wavelength for the L-band, and so on. As such, some multiplexer stages will provide multiple combining periods; in the present example, one stage would provide 30 nm and 90 nm multiplexing.

Commercially available couplers with periodic transmission can be employed in multiple pump multiplexing stages, which can provide different periods of multiplexing within a stage. For example, a three stage coupler 112 can be constructed using cascaded 30 nm, 15 nm, and 7.5 nm period couplers, but the various stages can be used to combine pump wavelengths having different periods. In this manner, it is also not necessary to use the same number of stages to combine each of the pump wavelengths.

The use of one multiplexing stage to provide multiplexing between pump wavelengths of different periods provides for additional flexibility in the deployment of the amplifiers 12 including the different types of multiplexing stages. For example, a 1450 nm pump wavelength could be used in the amplifier 12 being used only in the C-band until such time that it was desirable add the 1510 nm pump wavelength to upgrade the amplifier to provide C and L band amplification.

Figure 16:
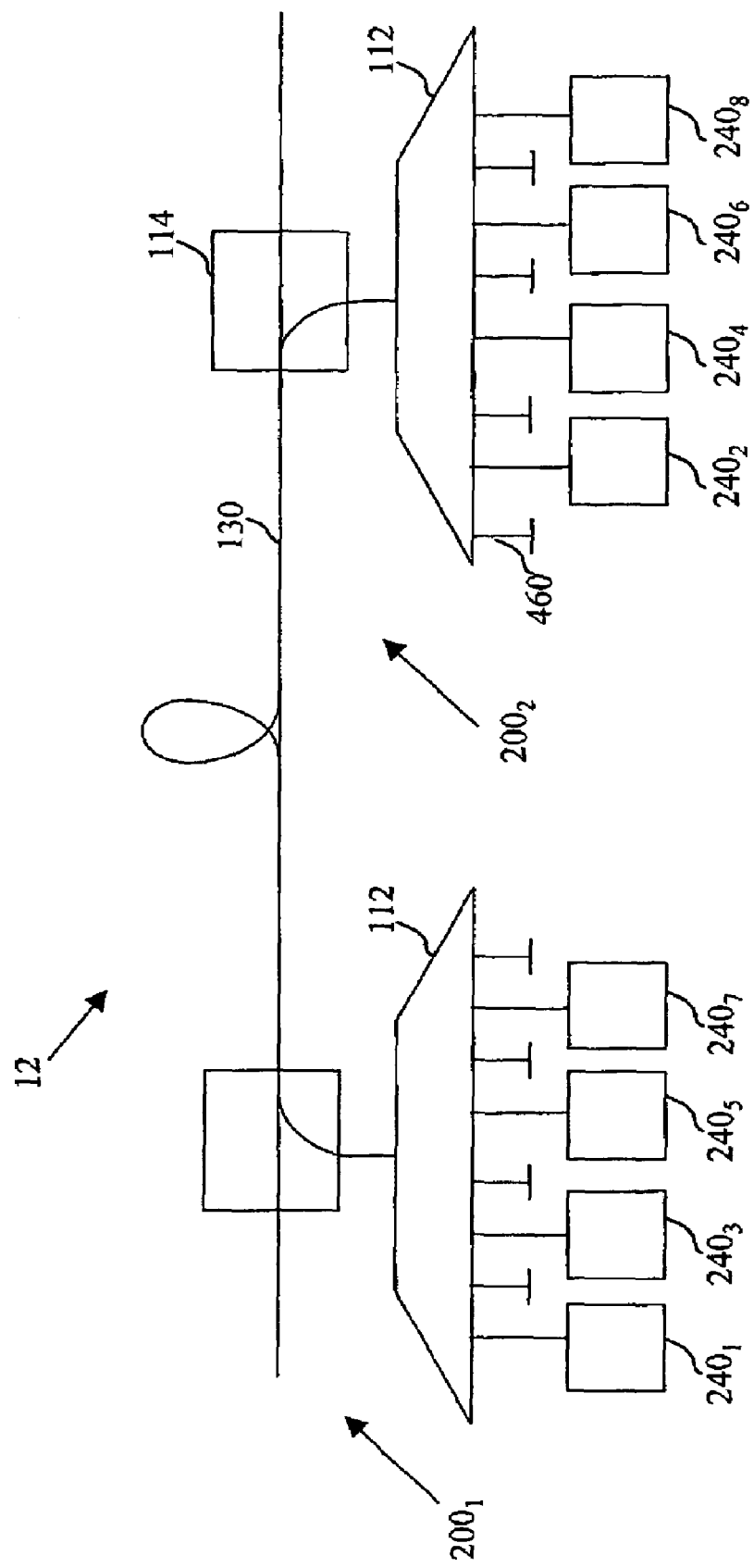
FIGS. 16 and 17 are exemplary amplifier embodiments employing pump assemblies.

FIG. 16 shows and embodiment of either a distributed or discrete, i.e., lumped, Raman amplifier, which is being supplied with pump power from two different pump assemblies, $200_1$ and $200_2$, respectively. The transmission fiber 130 can be carrying signal channel is one or both directions. In this embodiment, the pump wavelengths are selected and modified to be periodic pump wavelengths. The desired gain profile can be identified for the pump sources separately or in combination to provide a composite gain profile. The periodic coupler 112 is selected to have a period Δi that include all of the pump wavelengths in both pump assemblies, $200_1$ and $200_2$.

In the FIG. 16 embodiment, the pump power from each assembly 200 that reaches the combiner 114 associated with the other pump source would be coupled out of the transmission fiber and into the coupler 112. If the pump power is undesired, an isolator could be provided to prevent the pump power from propagating back through the coupler 112 toward the radiation sources 240. The pump power could be recycled, for example, by providing pump reflectors in the transmission fiber 130 or in the pump combining architecture between the pump/signal combiner 114 and the coupler 112. The use of pump reflectors in these locations would, of course, not allow for the addition of these pump wavelengths to the pump assembly 200 at a later time. Alternatively, a pump reflector 460 can be placed at the wavelength selective port on the coupler 112. Thus, the periodic pump power would be reflected back into the transmission fiber and the pump reflector could be removed, if it becomes necessary and/or desirable to introduce pump power via the pump assembly 200 at this pump wavelength in the future.

Figure 17:
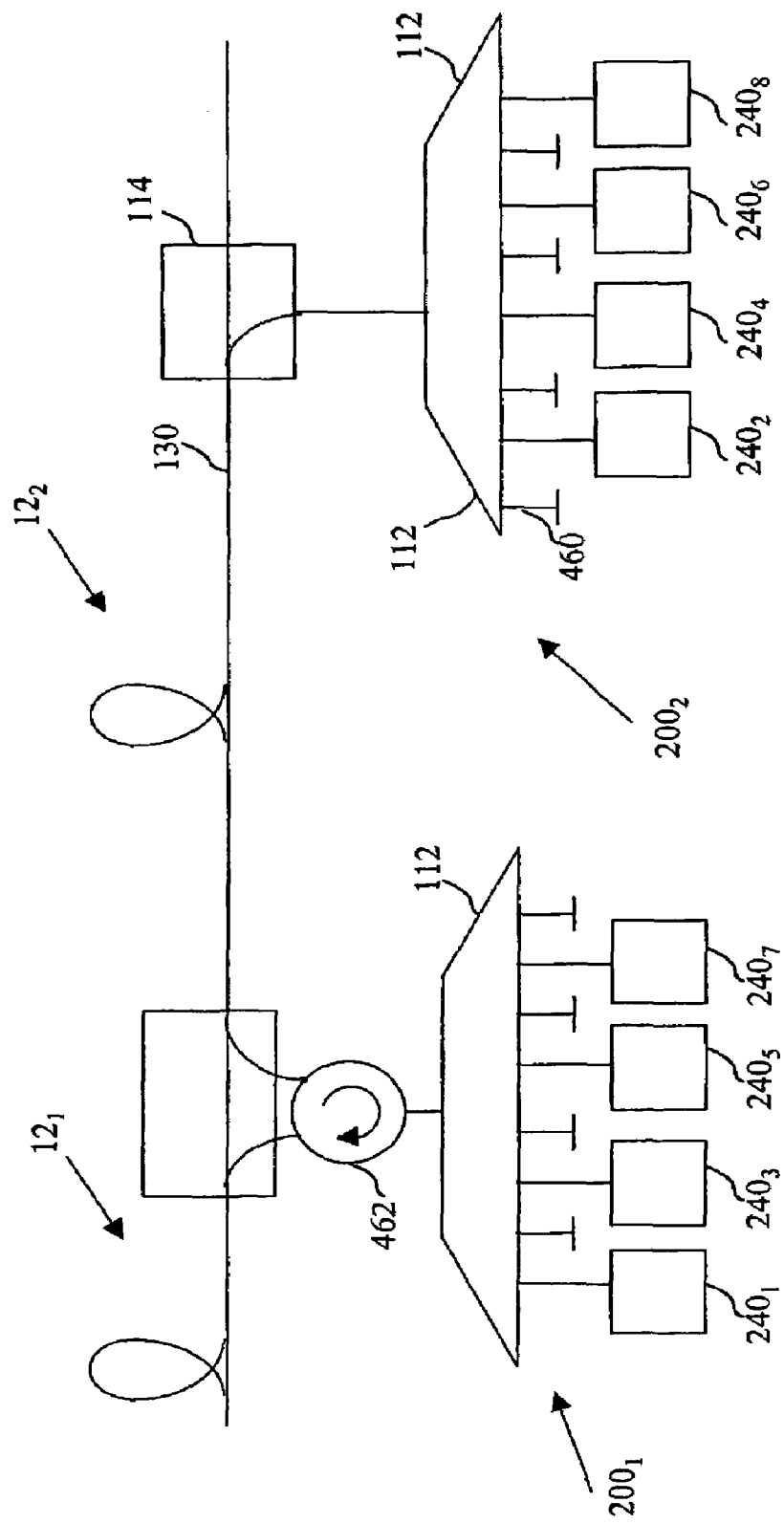

FIG. 17 shows an embodiment in which pump power is recycled between two different amplifiers, $12_1$ and $12_2$ as opposed to FIG. 16 embodiments in which the pump power was recycled within the same amplifier. It will be appreciated that pump power can be recycled both within and between amplifiers as desired and that the two amplifiers can be both distributed, both discrete, or one of each type. While the aforementioned description was provided with reference to Raman amplifiers, it will be appreciated that it applies to other types of amplifiers, including doped, non-linear, etc.

In FIG. 17 embodiments, pump power supplied from pump assembly $200_2$ to amplifier $12_2$ is removed from the transmission fiber 130 via combiner 114 and combined with the pump power from pump assembly $200_1$ via a circulator 462 and pump reflectors 460. In an exemplary embodiment, amplifier $12_1$ may be a distributed Raman amplifier and amplifier $12_2$ may be a discrete Raman amplifier.

Another beneficial aspect of the present invention is that periodic pump wavelength ports on the coupler 112 in pump assembly 200 that are unused during normal operation can be used to supply temporary and/or supplemental pump power, if one or more radiation sources and/or pump sources degrade or fail and have to be replaced. Supplemental pump wavelength can be used to supply additional pump power to a wavelength band or sub-band, if the system conditions vary over time, the pump power requirements increase, and/or the desired gain profile changes. For example, temporary pump power can be added using techniques, such as those described in U.S. patent application Ser. No. 09/310,324, which is incorporated herein by reference.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. An optical system comprising:
an optical coupler adapted for receiving and coupling pump radiation from a plurality of pump radiation sources, wherein a transmission of the optical coupler is periodic in radiation wavelength with a period $\Delta\lambda$;
a pump-signal combiner optically coupled to the optical coupler and receiving pump radiation from the optical coupler, the pump-signal combiner adapted for coupling pump radiation from the optical coupler with optical signals;
a plurality of pump radiation sources coupled to the optical coupler, wherein optical wavelengths of the pump radiation sources correspond to the periodic transmission of the coupler, and wherein at least one system parameter is adjusted to compensate for the optical wavelengths of the pump radiation sources corresponding to the periodic transmission of the coupler, wherein the at least one system parameter being adjusted includes the wavelength spacing $\Delta\lambda$ of transmission maximas of the coupler and adjusting the optical wavelengths of the pump radiation sources to correspond to the adjusted wavelength spacing of the coupler.

2. The system of claim 1, wherein the at least one system parameter is adjusted to provide a predetermined acceptable gain profile.

3. The system of claim 2, wherein the system parameter which is adjusted to provide an acceptable gain profile includes pump radiation power of at least one pump radiation source.

4. The system of claim 2, wherein:
the pump radiation sources produce a number of optical wavelengths; and
the system parameter which is adjusted to provide an acceptable gain profile includes the number of optical wavelengths produced by the pump radiation sources.

5. The system of claim 2, wherein:
the system includes a number of pump radiation sources; and
the system parameter which is adjusted to provide an acceptable gain profile includes the number of pump radiation sources.

6. The optical system of claim 1, further comprising:
a multiplexer adapted for multiplexing the optical signals and transmitting the optical signals to the pump-signal combiner, wherein the multiplexer multiplexes and transmits optical signals with a transmission that is periodic in optical wavelength with the period $\Delta\lambda$.

7. The optical system of claim 1, wherein the pump radiation from the pump-signal combiner provides a substantially flat Raman amplification gain to the optical signals over a desired wavelength range of optical signals.

8. The optical system of claim 1, wherein the optical wavelengths of the pump radiation sources correspond to transmission maximas of the optical coupler.

9. The optical system of claim 1, wherein the transmission of the optical coupler as a function of radiation wavelength is sinusoidal.

10. A method of coupling pump radiation from a plurality of pump radiation sources, the method comprising:
inputting the pump radiation from the plurality of pump radiation sources to an optical coupler, the pump radiation having more than one pump radiation wavelength, the optical coupler having a transmission that is periodic in radiation wavelength with a period $\Delta\lambda$, and the pump radiation wavelengths correspond to the periodic transmission of the coupler;
coupling the pump radiation in the optical coupler to provide coupled pump radiation;
coupling the coupled pump radiation with optical signals;
determining a gain profile for the coupled pump radiation;
adjusting at least one system parameter that includes the period $\Delta\lambda$ of the optical coupler to provide an acceptable gain profile.

11. The method of claim 10, wherein the coupled pump radiation provides a substantially flat Raman amplification gain to the optical signals over a desired wavelength range of optical signals.

12. The method of claim 10, wherein each of the more than one pump radiation wavelengths coincides with a transmission maxima of the optical coupler.

13. The method of claim 10, wherein the transmission of the optical coupler as a function of radiation wavelength is sinusoidal.

14. A method of coupling pump radiation from a plurality of pump radiation sources, comprising:
selecting pump radiation sources having pump wavelengths and powers to provide a desired gain profile;
adjusting pump wavelengths so that they correspond to periodic transmission maxima of an optical coupler used to couple the pump radiation sources;
determining a new gain profile after the pump wavelengths have been adjusted;
determining if the new gain profile is acceptable; and
adjusting at least one system parameter that includes the period $\Delta\lambda$ of the optical coupler, if the new gain profile is not acceptable.

15. The method of claim 14, further comprising:
determining a gain profile after adjusting at least one system parameter; and continuing to adjust at least one system parameter until the gain profile is acceptable.

16. The method of claim 14, wherein adjusting at least one system parameter includes adjusting pump powers.

17. The method of claim 14, wherein adjusting at least one system parameter includes adjusting pump wavelengths.

18. The method of claim 14, wherein:
selecting pump radiation sources includes selecting a number of pump wavelengths; and
adjusting at least one system parameter includes changing the number of pump wavelengths.

19. The method of claim 14, wherein:
selecting pump radiation sources includes selecting a number of pump radiation sources; and
adjusting at least one system parameter includes changing the number of pump radiation sources.

20. The method of claim 14, wherein adjusting at least one system parameter includes:
adjusting pump powers; and
adjusting pump wavelengths.

* * * * *